United States Patent [19]

Stoll et al.

[11] Patent Number: 4,923,639
[45] Date of Patent: May 8, 1990

[54] METHOD OF PROCESSING PLUTONIUM AND/OR URANYL NITRATE

[75] Inventors: Wolfgang Stoll, Hanau; Christian Ost, Mainaschaff; Volker Schneider, Heusenstamm, all of Fed. Rep. of Germany

[73] Assignee: Alkem GmbH, Hanau, Fed. Rep. of Germany

[21] Appl. No.: 339,753

[22] Filed: Jan. 15, 1982

[30] Foreign Application Priority Data

Jan. 19, 1981 [DE] Fed. Rep. of Germany ....... 3101505

[51] Int. Cl.$^5$ ............... G21F 9/08; G21F 9/14; C01G 43/01; C01G 56/00
[52] U.S. Cl. ............... 252/632; 252/627; 252/628; 252/631; 252/633; 423/251; 423/254; 423/260; 423/20
[58] Field of Search ............... 252/626, 627, 633, 631, 252/632, 641; 423/251, 249, 254, 260, 20, 15

[56] References Cited

U.S. PATENT DOCUMENTS

| | | | |
|---|---|---|---|
| 2,877,090 | 3/1959 | Finzel | 423/251 |
| 3,346,346 | 10/1967 | Schikarski et al. | 423/260 |
| 3,794,470 | 2/1974 | Meyer et al. | 423/251 |
| 3,935,120 | 1/1976 | Kanij et al. | 423/260 |
| 3,949,048 | 4/1976 | Holt, Jr. | 423/10 |
| 3,981,960 | 9/1976 | Brambilla et al. | 423/5 |
| 4,206,073 | 6/1980 | Hesky et al. | 423/249 |
| 4,235,740 | 11/1980 | Druckenbrodt et al. | 423/251 |
| 4,565,672 | 1/1986 | Schneider et al. | 423/15 |

Primary Examiner—Howard J. Locker
Attorney, Agent, or Firm—Herbert L. Lerner; Laurence A. Greenberg

[57] ABSTRACT

Method for treating plutonium and/or uranyl nitrate by superheating and concentrating a nitric acid starting solution, characterized by the feature that nitric acid starting solution is concentrated to form a Pu(VI)- and/or U(VI)-containing nitrate melt, is poured into a mold, is solidified by cooling down, and is transported and/or stored as a solidified solid body until further processing.

10 Claims, 1 Drawing Sheet

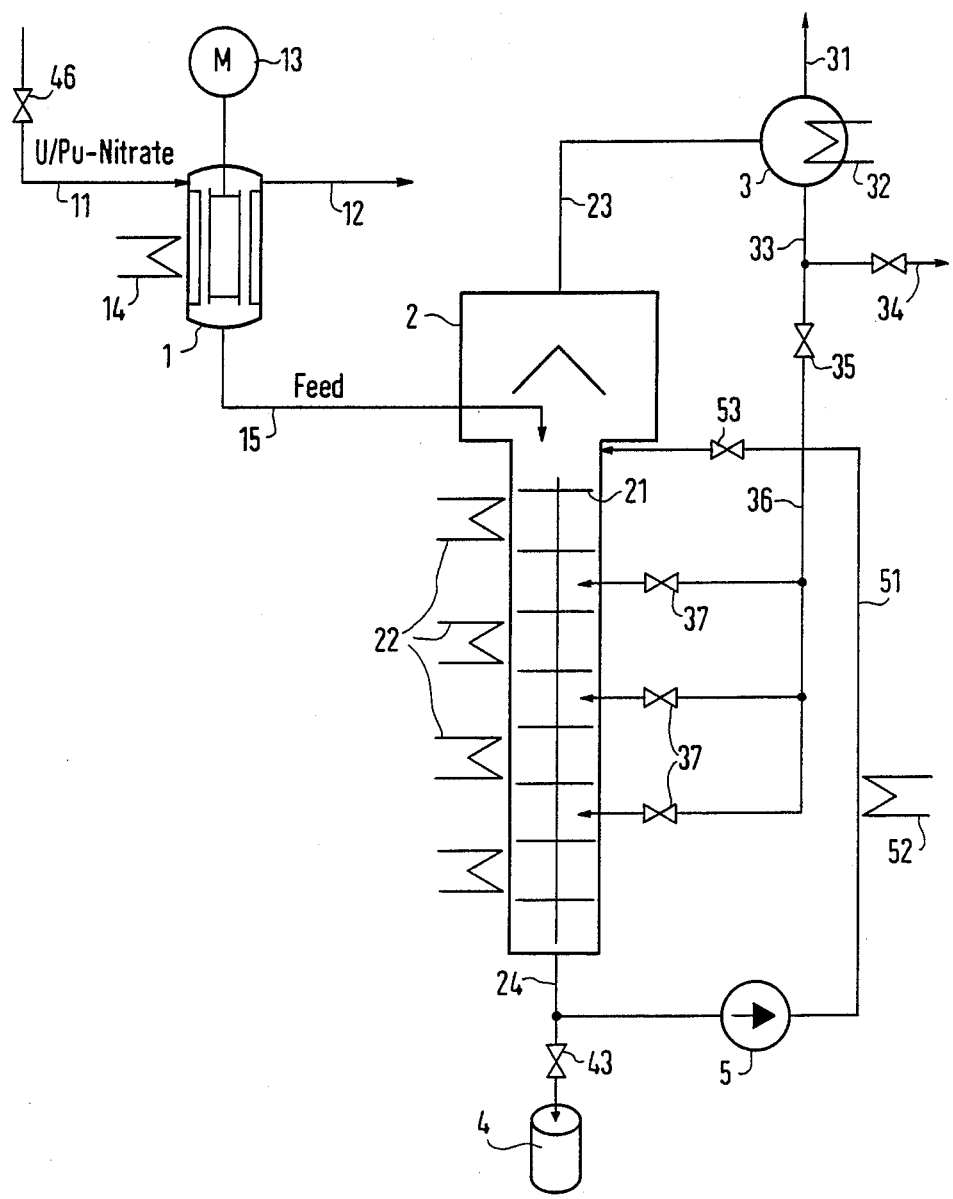

METHOD OF PROCESSING PLUTONIUM AND/OR URANYL NITRATE

BACKGROUND OF THE INVENTION

1. Field of the Invention

The invention relates to a method of treating plutonium and/or uranyl nitrate in a nitric acid starting solution to produce a nitrate in compact solid form which can with greater safety be stored or transported as a solid body until further processes.

2. Description of the Prior Art

U.S. Pat. No. 4,235,740 discloses heating and concentrating a nitric acid starting solution. For further processing, such heated and concentrated starting solution can be drained into a precipitation device, in which for instance ammonium carbonate solution is admixed and ammonia and excess $CO_2$ are dosed in, so that finally $(NH_4)_4 PuO_2 (CO_3)_3$ or $(NH_4)_4 (Pu/U)O_2 (CO_3)_3$ is precipitated. This precipitated product can be calcined in accordance with U.S. Pat. No. 4,235,740 in a reducing atmosphere and subsequently oxidized, while air is being supplied, to form powdered $PuO_2$ or $(Pu/U)O_2$ for instance with stoichiometric oxygen content. The powdered $PuO_2$ or $(Pu/U)O_2$ can be sintered to form nuclear fuel bodies for nuclear reactor elements.

As is well known, plutonium or uranium is produced as plutonium nitrate or uranyl nitrate in a nitric acid liquid solution if irradiated, burned-up uranium nuclear fuel is reprocessed.

The plutonium and the uranium can then be stored and/or transported in the form of this nitric-acid liquid solution up to reprocessing the metal into oxide. This procedure however, is extremely expensive, particularly since the nitric acid solution can contain only about 200 to 400 grams plutonium or uranium per liter, so that storage or transport tanks as well as auxiliary piping and pumps of considerable volume are required which must be protected against leakage of the solution.

It is true that the plutonium or the uranium in the liquid nitric acid solution can also be converted immediately after this solution is produced at the reprocessing site of the burned-up nuclear fuel, for instance to powdered plutonium oxide or uranium oxide, so that only this plutonium or uranium oxide in powder form need be stored and/or transported. When plutonium is stored, however, its isotope with the atom number 241 decays radioactively to americium-241 which emits hard $\gamma$ rays and is also a neutron poison. If the plutonium is stored too long, the americium-241 content becomes excessively high and must therefore be removed in many cases before the stored plutonium can be processed further. For this purpose, the plutonium must be present dissolved in nitric acid.

Plutonium oxide ($PuO_2$), however, can be dissolved completely in nitric acid only if special measures are taken, such as the addition of hydrofluoric acid. If, therefore, stored plutonium oxide in powder form is processed further into nuclear fuel bodies, it must first be dissolved in an $HNO_3$/HF-mixture, the americium-241 must be separated and the residual solution again converted into plutonium oxide. The facilities required for the dissolution must be made of highly corrosion-resistant material and are therefore elaborate and expensive.

It is furthermore impractical to convert plutonium and/or uranyl nitrate solution produced in reprocessing of burned-up uranium nuclear fuel immediately at the reprocessing site into powdered plutonium or uranium oxide, because, for example, the grain size and the flowability of the oxide powders are determined by the conversion process used. It is, therefore, more advantageous as a rule for the manufacturers of fuel asesmblies to carry out the conversion step to oxide powder themselves, since, the grain size and the flowability can then be better adapted to the individual requirements of the fuel assembly manufacturers.

SUMMARY OF THE INVENTION

It is an object of the invention to provide a method for treating plutonium and/or uranium produced in the reprocessing of burned-up nuclear fuel so that it can be stored, transported and subsequently reprocessed without great cost and without difficulties.

With the foregoing and other objects in view, there is provided in accordance with the invention a method for treating a nitrate selected from the group consisting of plutonium nitrate and uranyl nitrate and mixtures thereof in aqueous nitric acid solution to produce a nitrate in compact solid form which can with greater safety be stored or transported as a solid body until further processing, which comprises (a) oxidizing plutonium nitrate which may be contained in the aqueous solution to cause the plutonium to reach a stage of oxidation with a valence of VI, (b) heating the aqueous solution to vaporize water and nitrogen oxides and form a Pu(VI)-containing nitrate melt or a U(VI)-containing melt or melt of said latter two nitrates, (c) pouring the melt into a mold wherein the melt is solidified by cooling down, and (d) storing or transporting the solidified body until further processing.

Other features which are considered as characteristic for the invention are set forth in the appended claims.

Although the invention is illustrated and described herein as embodied in a method of processing plutonium and/or uranyl nitrate, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is schematically shown apparatus for carrying the method of the invention in which a U/Pu nitrate solution is first subjected to heating in an evaporator and the solution concentrated by removal of part of the nitric acid by evaporation, and the concentrated solution then introduced into a bubble column wherein oxidizing of plutonium, if any, to the VI valence takes place and evaporation is continued to produce a melt which will, when discharged into a hollow cylinder container or mold, solidify by cooling.

DETAILED DESCRIPTION OF THE INVENTION

The method of the type mentioned at the outset is characterized, according to the invention, by the feature that the nitric-acid starting solution is concentrated to a Pu(VI)-and/or U(VI)-containing nitrate melt and is poured into a mold, solidified by cooling and is transported and/or stored as a solidified solid body until further processing.

Advantageously, a mold with geometric dimensions is used which are safe against criticality.

The mold containing the solid body can be packed and transported and/or stored subsequently without difficulty until the solid body is further processed. When required, the solid body is melted again in the mold. The liquid nitrate melt can then be drained from the mold into a solution vessel and dissolved there, while stirring, in pure nitric acid, optionally for removing the americium 241 and subsequent further processing. The addition of hydrofluoric acid is eliminated here. It is also possible to dissolve the solid body directly from the mold in nitric acid which contains no hydrofluoric acid. Optionally, use is made here of the fact that plutonium forms mixed crystals with uranium which mixed crystals are highly soluble in fluorine-free nitric acid.

Solid bodies of solidifed nitrate melt containing predominately material with the chemical formula $UO_2(NO_3)_2$, $PuO_2(NO_3)_2$ and/or $(U/Pu)O_2(NO_3)_2$ can be stored and transported in a substantially more compact and therefore space-saving manner than nitric-acid plutonium and/or uranium solutions filled into tanks. These solid bodies also develop practically no radiolysis gases which are relevant for safety, for instance hydrogen which is produced particularly when storing liquid nitric-acid plutonium solution and plays a considerable role there.

The invention and its advantages will be explained in greater detail by an embodiment example with reference to the drawing:

The drawing shows schematically a plant for manufacturing and draining a U/Pu-nitrate melt. The plant has an evaporator 1 to which is fed through line 11 and shutoff valve 46, a liquid nitric acid solution of plutonium and/or uranyl nitrate, i.e. $Pu(NO_3)_4$ and/or $UO_2(NO_3)_2$. A nitric-acid solution of $PuO_2(NO_3)_2$ can also be fed to the evaporator 1. The evaporator 1 is equipped with a stirrer 13 and a suitable heating device 14 for heating the contents. Nitric acid is evaporated from this evaporator 1, and discharged via line 12. The nitric-acid vapor released from evaporator 1 may be condensed, not shown, and the condensate can be used again advantageously as the solvent for Pu and/or U. Preheating of the liquid nitric acid solution of plutonium and/or uranyl nitrate to a temperature of 120°–140° C. takes place in evaporator 1 as well as removal of some nitric acid to produce a concentrated but nevertheless liquid solution at normal temperature and pressure of 20° C. and 760 mm Hg.

The concentrated liquid U/Pu-nitrate solution is withdrawn from the bottom of the evaporator 1 and introduced through line 15 to the upper end of a vertical bubble column 2. To increase the dwelling time of the nitrate solution, this bubble column 2 contains screen plates 21 arranged on top of each other. The column is furthermore equipped over its entire length with electric heating devices 22 to supply heat to the nitrate solution in the column. The nitrate solution flows from the pipeline 15 from the top down through the bubble column 2 in which it is gradually heated along its way from 120° to 140° C. at the mouth of the pipeline 15 to about 140° to 170° C. at the bottom of the bubble column 2. Such heating causes vaporization of nitric acid and water usually in the form of water vapor and nitrogen oxide gases which consist mostly of $NO_2$. The nitric acid vapor escaping from the bubble column 2 through line 23 is condensed in a condenser 3 by contact with cooling coils 32 through which a coolant such as water flows. The condensate 33 of liquid nitric acid can be directed via lines 33 and 34 to a collecting tank (not shown) or through valve 35 and the pipeline 36 back into the bubble column 2 as an oxidant. The amounts of nitric acid introduced into the bubble column 2 are controlled by valves 37. The exhaust from the condenser 3 which contains principally nitrous oxide $NO_2$ is discharged through line 31.

The liquid U/Pu-nitrate solution fed from the pipeline 15 is concentrated in the bubble column 2 to the extent that there is at the bottom of the column, finally, a liquid nitrate melt, in which furthermore the plutonium is oxidized-up to the valence VI. The discharge of the melt may readily be determined as for example by periodically drawing-off samples from the bubble column 2 and testing the samples. The melt should solidify by cooling in the surrounding atmosphere (about 20° C.). This nitrate melt $(U/Pu)O_2(NO_3)_2$, is poured via a line 24 equipped with a shut-off valve 43 into a mold 4 in which it solidifies by cooling. This mold 4 has, for instance, the shape of a hollow cylinder. Thereby, advantageously, the solid body into which the U/Pu-nitrate melt is solidified in the mold 4, has geometric dimensions which are safe as to criticality. The mold 4 containing the solid body is packed and subsequently transported and/or stored. By remelting and dissolving the melted liquid in nitric acid which need not contain hydrofluoric acid, the solid body can finally be processed further.

The line 24 is also connected to line 51 which is provided with pump 5 followed by a shutoff valve 53, and which line 51 leads to the upper end of the bubble column 2. Circulation through line 1 may be carried out to insure oxidizing the plutonium and to facilitate evaporation. Also, in the event draining of the U/Pu-nitric melt into mold 4 must be stopped by closing the shutoff valve 43, part of the nitrate melt can be pumped back from the pipeline 24 through the open valve 53 into the bubble column 2. The line 51 has an additional heating device 52 for compensating for heat losses.

The bubble column 2 advantageously has geometric dimensions which are safe with respect to criticality. The entire plant according to the drawing can also be kept at underpressure relative to the environment, i.e. at subatmospheric pressure, so that no plutonium escapes into the environment at leaky points.

The concentration of the nitric acid starting solution can also be accomplished, instead of in a bubble column, for instance in a simple evaporator by heating it to a temperature of up to 170° C. The nitrate melt produced, the nitrate of which is substantially a material with a chemical formula $(U/Pu)O_2(NO_3)_2$, can be drained off from the evaporator into molds and cooled off for storage and/or transport in the solidified state until further processing.

We claim:

1. Method for treating a nitrate selected from the group consisting of plutonium nitrate and uranyl nitrate and mixtures thereof in aqueous nitric acid solution to produce a nitrate in compact solid form which can with greater safety be stored or transported as a solid body until further processing, which comprises (a) oxidizing plutonium nitrate which may be contained in the aqueous solution to cause the plutonium to reach a stage of oxidation with a valence of VI, (b) heating the aqueous solution to vaporize water and nitrogen oxides and form a Pu(VI)-containing nitrate melt or a U(VI)-containing melt or melt of said latter two nitrates, (c) pouring the melt into a mold wherein the melt is solidified by cooling down, and (d) storing or transporting the solidified body until further processing.

2. Method according to claim 1, wherein the nitrate to be treated is plutonium nitrate.

3. Method according to claim 1, wherein the nitrate to be treated is uranyl nitrate.

4. Method according to claim 1, wherein the nitrate to be treated is a mixture of plutonium nitrate and uranyl nitrate.

5. Method according to claim 1, wherein said oxidizing step (a) and heating step (b) are carried out simultaneously.

6. Method according to claim 5, wherein said oxidizing and said heating are carried out in a vessel, and wherein a liquid stream containing nitric acid of the vessel contents is withdrawn from one point of the vessel and returned to another point of the vessel to facilitate said oxidizing.

7. Method according to claim 6, wherein said vaporized water and nitrogen oxides are vaporized from said vessel and condensed at least in part, and wherein at least part of said condensate is returned as an oxidant in said oxidizing to the heated aqueous solution in the vessel.

8. Method according to claim 1, wherein a mold with geometric dimensions is used which are safe with respect to criticality.

9. Method according to claim 1, wherein the solidified body is dissolved in nitric acid for further processing.

10. Method according to claim 1, wherein the solidified body is melted for dissolution in nitric acid.

* * * * *